June 26, 1962 W. F. BERCK 3,040,573
AIR ELIMINATOR SYSTEM FOR METERING LIQUIDS
Filed Sept. 2, 1958 3 Sheets-Sheet 1

INVENTOR.
WILLIAM F. BERCK
BY
Mellin and Hanscom
ATTORNEYS

June 26, 1962  W. F. BERCK  3,040,573
AIR ELIMINATOR SYSTEM FOR METERING LIQUIDS
Filed Sept. 2, 1958  3 Sheets-Sheet 2

INVENTOR.
WILLIAM F. BERCK
BY
Meelin and Hanscom
ATTORNEYS

INVENTOR.
WILLIAM F. BERCK

United States Patent Office
3,040,573
Patented June 26, 1962

3,040,573
AIR ELIMINATOR SYSTEM FOR METERING
LIQUIDS
William F. Berck, Hayward, Calif., assignor to Ralph N.
Brodie Company, San Leandro, Calif., a corporation
of California
Filed Sept. 2, 1958, Ser. No. 758,242
12 Claims. (Cl. 73—200)

This invention relates to apparatus for use with fluid meters, whereby means is provided to check the flow in the metering line when an excess of free air or entrained gases is pumped into the system.

Since the inception of the use of positive displacement liquid meters, there has been a continuing problem in preventing the registration of free air or entrained gases. A solution for this problem becomes especially difficult when the supply tank empties, for then free air is forced into the metering system by continuing operation of the pump. Many devices have been used in attempting a solution but with limited success.

The equipment previously known in the metering art has become rather standardized and comprises essentially an air separator, wherein a chamber is provided upstream of the meter for trapping air bubbles in the flow stream. A float operated air release valve is disposed in the upper region of the chamber and is operated to an open position as the liquid level drops with accumulation of air bubbles and other gases. In addition to the air separation chamber, a butterfly check valve has been placed in front of the metering device and operatively connected to a float in the separation chamber. Under normal metering conditions the butterfly valve would be fully open and the air release valve closed; but, as increasing quantities of air enter the system and fill the separation chamber, the float or floats therein disposed will operate the air release valve to open and the butterfly valve to close. The operation of these valves could be made to operate simultaneously, or, in a preferred arrangement, the float for the air release valve would function first, then, if the air escape was insufficient and the liquid level dropped still further, the float operating the butterfly valve would drop, closing the valve, and thereby preventing air from passing into the meter.

These prior art devices worked satisfactorily as long as the flows of liquid were no greater than 50 gallons a minute and the pump pressures did not exceed 50 pounds per square inch. If trouble was encountered by the inability to eliminate air from the system, it was customary to install a spring loaded check valve on the discharge end of the meter. This check valve provided a back pressure on the system and produced several desirable results. First, it aided in air separation by slowing down the liquid; and since a small quantity of air would then be passed through the system in the same period of time, the air separator and its air release valve were better able to accommodate and to discharge the trapped air. Second, the check valve aided air elimination by increasing the differential pressure across the float operated air release valve, thus producing a more rapid discharge of the trapped gases. And, third, by increasing the pressure in the metering system, the size of entrained air bubbles occupied a lesser volume and, therefore, error due to gases passing through the meter was reduced. However, while the spring loaded check valve produced these desirable results, the fact that the flow of liquid was necessarily reduced was a serious drawback, and the greater the spring load in this check valve, the greater the reduction in flow.

In all phases of the petroleum industry it has been essential to increase the rate of handling petroleum products in order to check the rising costs of fluid transfers. New types of pumps are now available on the market, and in recent months the ability to produce pressures in tank truck equipment has far exceeded that which was thought to be reasonable. As a consequence of this development in the pump industry, the speeds of tank truck deliveries have been greatly increased. In many areas today speeds of 75 gallons a minute are not unusual and pressures of 60 to 75 pounds per square inch are normal. Tank trucks are in use in some areas where speeds of delivery above 100 gallons per minute are obtained and pump pressures are in a range of 120 to 150 pounds per square inch.

Conventional types of air separation and air elimination apparatus such as previously described are inadequate for handling modern standards of fluid delivery. For, when the supply tank becomes empty, huge quantities of air are passed rapidly into the system by the high pressure pumps. The air separator and its air release valve are incapable of handling such an immediate demand for air elimination, and quantities of air are pushed through the meter before the valves close.

It is to be noted that the conventional apparatus heretofore described depended upon a change in liquid level in the air separating chamber to sense the presence of an over-accumulation of air. The float operated valves followed the liquid level as air entered the system, and with high rates of flow they responded too late with too little capacity to prevent air from passing through the meter.

This invention provides a novel and effective system for preventing entrained air from passing into the fluid meter. The system takes a signal from the operation of the pump, or some other device which will detect changes in the air to liquid ratio of the fluid being forced into the flowline. The signal produced by such a device operates various valve means to prevent the metering of all but a small quantity of fluid unless the signal indicates normal fluid flow conditions.

Therefore, one object of this invention is to provide a novel system of metering fluid whereby abnormal quantities of entrained gases are detected before reaching an air separator and whereby means are provided responsive to a signal for impeding the flow into the meter and for removing entrained gases from the flowline.

A second object is to provide apparatus for separating and eliminating large quantities of gases from a metering system and, thus, preventing such gases from being passed through the meter and registered.

A third object is to provide a novel means for detecting entrained gases and almost instantaneously impeding fluid flow into a meter.

Another object of this invention is to provide a means for detecting quantity of entrained gases passing into a metering system and using this means to operate flow control valves.

A further object of this invention is to provide a means for producing a pressure change in a metering flowline responsive to changes in the quantity of entrained gases in combination with means to sense a pressure change and operate one or more flow control valves.

Another object of this invention is to provide a means for detecting a predetermined quantity of entrained air in a flowline.

Another object of this invention is to provide a pressure sensing device to operate a system of control valves in a metering system to prevent the registration of entrained gases.

It is another object of this invention to provide a novel shuttle valve device for sensing the pressure of an applied fluid and directing this fluid in one of two paths depending on the level of applied fluid pressure.

A further object is to provide a powerful check valve which acts to stop the flow in a metering flowline when the quantity of entrained gases passing into the system exceeds a predetermined level. In the described system this check valve has no appreciable effect upon the rate of flow during normal operating conditions but at the proper time functions to more effectively reduce the flow of fluid than other valves of its kind.

Other objects and advantages of this invention will be suggested by the description and drawings. Persons skilled in the art will understand that variations may be made in the flow system and the devices used without departing from the principles disclosed; and, the use of any structures or arrangements that are properly within the scope of the appended claims is contemplated.

Figure 1:
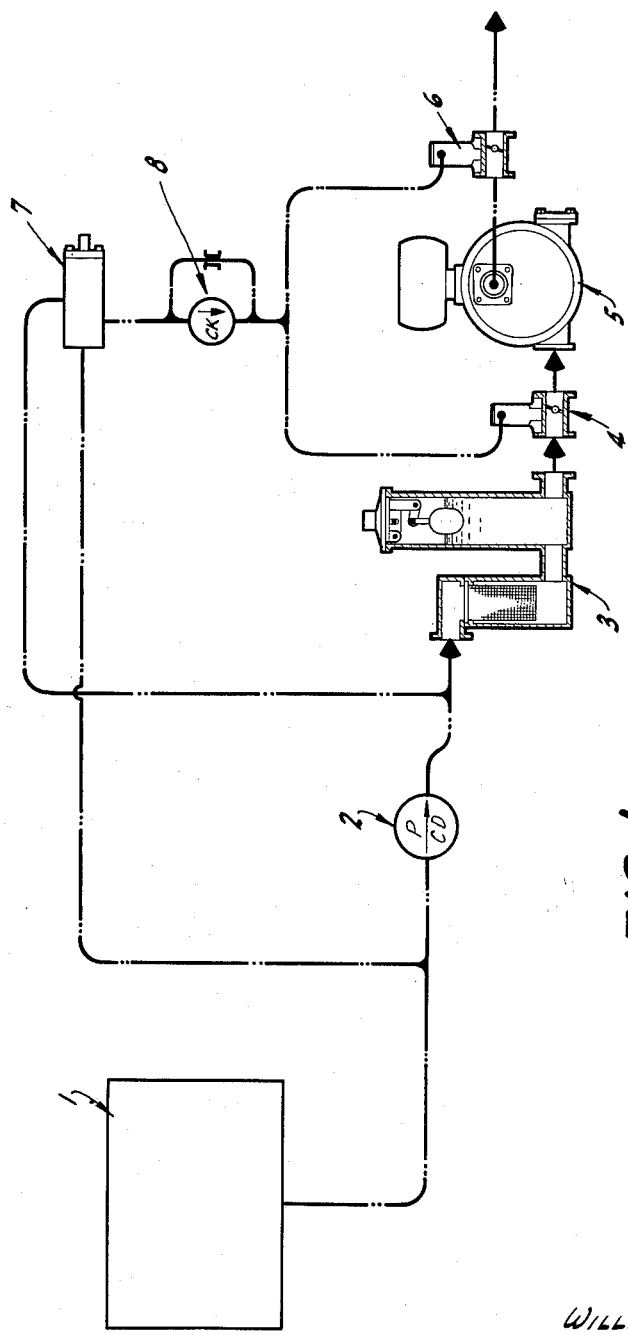
FIG. 1 is a partly schematic illustration of the flow system described, showing the interrelationships of the various apparatus.

Referring to FIG. 1 of the drawings, the fluid to be metered is drawn from a supply tank 1 by a pump 2 and is forced through a flowline which includes gas separator and eliminator 3, a valve means 4, fluid meter 5 and a second valve means 6. The air eliminator 3 is similar to those in prior art devices and, as shown, comprises a strainer basket and the conventional trap chamber with float operated air release valve. It will be noted that the air eliminator is connected upstream of the meter to intercept the entrained air as it is passed through the flowline. The valve means 4 and 6 are of identical structure and are described below in detail. For present purposes, it should be observed that the valve means are disposed on opposite sides of the meter and may be operated between open and closed positions. An operating means 7 and 8 functions responsively to a predetermined quantity of entrained gas passing through the flowline and closes the valve means 4 and 6. A more detailed account of the structure and operation of each of these devices will follow. In general, then, this apparatus is utilized in a metering system for preventing the registration of entrained gases which may be forced into the flowline, especially when the supply tank empties and the pump feeds large quantities of the air into the system.

The operating means 7 and 8 takes its signal from the operation of the pump 2. Pumps characteristically lose efficiency when air or entrained gases are acted upon, and this is true for even the most efficient designs available today. The loss in efficiency is attributable to the differences in viscosity between a liquid and that liquid with entrained air. A change in viscosity results in a change in the slippage characteristic of the pump and, hence, also its efficiency. Since there is more slippage when the entrained air enters the pump, the efficiency correspondingly decreases and the pressure output immediately drops. A positive displacement pump is utilized in a preferred embodiment of this invention because such a pump is presently capable of very high pressures and delivery rates. Centrifugal pumps could also be used, however, and their use is considered to be within the purview of this invention.

The pump 2 is utilized as means for detecting the quantity of gas passing through the flowline and producing a variable signal in response thereto. In contrast to the prior art devices which detect quantitative amounts of trapped air in the air eliminator, this system does not depend on a build up of entrained gases for operation of the valve means. If the percentage of entrained air in the liquid passing through the pump increases, the efficiency and output pressure decrease. This change in the output pressure can be utilized to operate the valve means and impede the flow of fluid through the meter.

The invention further involves a means responsive to a predetermined level of signal from the positive displacement pump for operating the valve means 4 and 6. The means employed comprises a pressure sensitive shuttle valve 7 and a flow control valve 8, and together with the pump 2 constitute a means responsive to predetermined quantity of entrained gas to operate the valve means.

Figure 2:
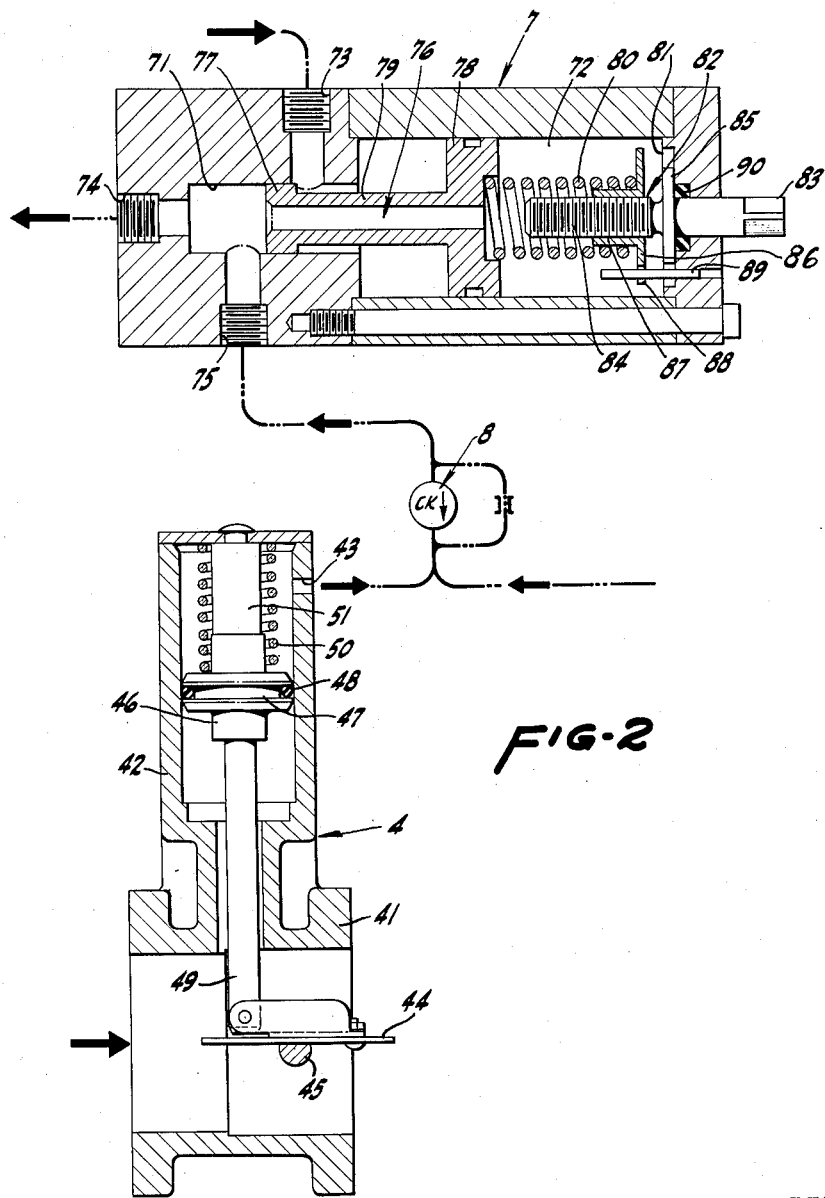
FIG. 2 is a view of a part of the system, showing details of the shuttle valve and butterfly valve, each valve shown partly in section and in the position occupied under normal flow conditions.
Figure 3:
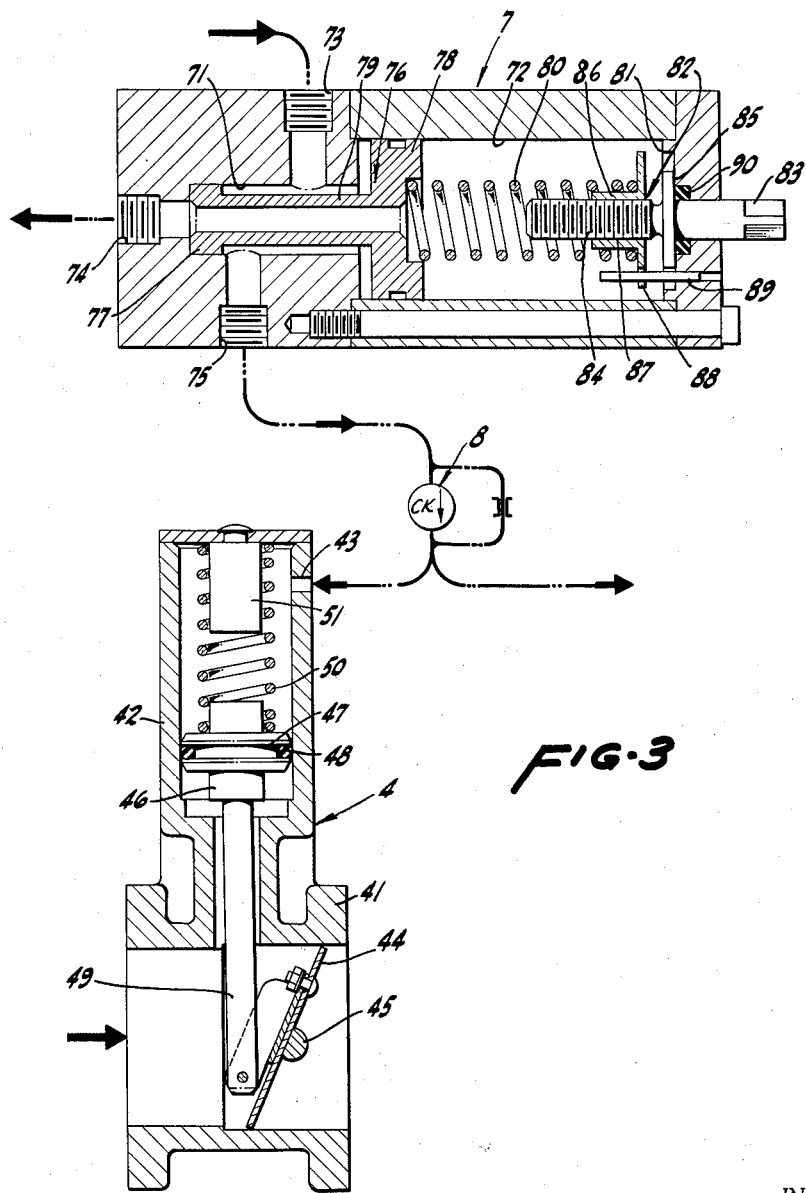
FIG. 3 is another view of the shuttle valve and butterfly valve, each valve shown partly in section but in a position occupied when a predetermined quantity of entrained gas is detected in the flowline.

Shuttle valve 7 is illustrated in FIGS. 2 and 3 and may be described as comprising a housing having a first cylindrical chamber 71 and a second cylindrical chamber 72. These chambers are axially connected to form a continuous fluid passageway therebetween. Three passages 73, 74 and 75 are also formed in the housing, each passage connecting with chamber 71 from without and opening into the chamber at spaced axial distances.

A tubular valve element 76 which defines an inner conduit is disposed in the housing with a first cylindrical head portion 77 slidably mounted in chamber 71. A second cylindrical head portion 78 is slidably mounted in chamber 72 and is connected to the first head portion by a reduced body portion 79. The head portion 78 being much larger than head portion 77, fluid pressure entering passage 73 from the flowline will exert greater force on the larger head and tend to drive the valve element into chamber 72. However, a spring biasing means 80, comprising a coiled spring, as shown, is disposed near the inner end 81 of the chamber 72 and is compressed between the head portion 78 and a spring adjusting means 82.

The adjusting means is mounted in the inner end 81 and comprises a rotatable shaft 83, a spring seating plate 86, and a rotational restraining pin 89. The shaft is supported on the housing, one end accessible from without and the other end projecting axially into the second chamber and provided with a threaded portion 84. A disk collar 85 is formed integrally with the shaft, or, in the alternative, may be rigidly connected thereto, limiting outward axial movement of the shaft. Between the collar 85 and inner end 81 is a sealing means 90 which prevents the escape of fluid and loss of fluid pressure.

The spring seating plate 86 is formed like a collar and has a threaded hole 87 mating with the threaded portion 84 on the shaft. In addition, an opening 88 is provided in the plate for receiving the rotational restraining pin which protrudes from the housing into the second chamber.

In operation, the spring of this shuttle valve is adjusted by rotating the shaft 83. Since the seating plate is restrained from rotational movement by pin 89, the mating threads of plate and shaft cooperate to extend or retract the seating plate in an axial direction and thereby perform adjustments on the compression spring 80. Adjustment is made to secure wide open operation of the valve means 4 and 6 at a predetermined level of signal from the flowline, as previously described.

When sufficient fluid pressure is supplied through passage 73, valve element 76 is moved to the position shown in FIG. 2, passage 75 then being in open communication with passage 74. Since passages 75 and 74 are respectively connected to the valve means and the suction side of the pump, the fluid pressure used to operate the valve means closed is vented to the low pressure side of the flowline. If the fluid pressure source applied via passage 73 is decreased below a predetermined level, the spring bias means 80 overcomes the force of liquid pressure and moves the valve element to the position shown in FIG. 3. The flowline pressure is now directed from passage 73 into chamber 71; and, circulating about the reduced body portion 79, it is applied through passage 75 and operates the valve means to their closed position. At this time first head portion 77 is advanced between the opening which passage 75 makes with chamber 71 and the opening made with passage 74.

It will be noted that the tubular valve element is constructed without seals of any sort in order that it will move freely and very quickly under small changes in pressure. The slippage which occurs across head portion 78 drains back through the center of the valve element to the suction side of the pump. What fluid passes between head portion 77 and chamber 71 drains directly into the suction passage 74.

The flow control valve 8 is of conventional design, its purpose being to admit a free flow of fluid to the valve means when the shuttle valve is in the position shown in FIG. 3, but to restrict the outflow of pressure from the valve means when the shuttle valve occupies the position shown in FIG. 2. As will be pointed out more clearly, it is not desirable to vent the valve means 4 and 6 too quickly lest a certain quantity of gas be admitted into the meter before the eliminator exhausts that which has previously been sucked into the flowline. A flow control valve which is satisfactory for this purpose is manufactured by Modernair, 400 Preda Street, San Leandro, California.

The operating means 7 and 8 are connected in series with the valve means and when assembled will operate as a means responsive to a predetermined signal for impeding the flow of fluid through the flowline. Each valve means is constructed like the other, comprising a housing which defines a conduit portion 41 and a cylindrical chamber portion 42. The conduit portion is insertable in a section of the flowline and forms a part thereof. The cylindrical chamber portion opens into the conduit portion with its axis substantially normal to the axis of the conduit portion. The inner end of chamber 42 is closed with the exception of a passageway 43 formed in the housing and providing fluid connection between the upper end of the chamber and the operating means 7 and 8.

A butterfly valve device 44 is disposed in the conduit portion downstream of the opening between conduit 41 and chamber 42. The valve device is pivotally mounted on a shaft 45 which extends into the flowline with its axis substantially normal to the axis of the chamber. A piston 46 is disposed in the chamber 42 and carries a piston rod 49 which extends into the conduit 41 and is pivotally connected to the butterfly device at a point spaced from the axis of shaft 45. Piston 46 is provided with a peripheral groove 47 and carries a sealing ring 48. The sealing ring prevents free flow of fluid around the piston but will not unduly limit reciprocation thereof. Taken with reference to FIGS. 2 and 3, it will be observed that as the piston moves axially in the chamber 42, the butterfly valve device moves between open and closed positions.

Between the inner end of chamber 42 and the piston 46 is a spring biasing means 50 which urges the piston toward the conduit portion, tending to close the valve. Spring 50 is coiled about a spring guide and bumper stop means 51 which is rigidly connected to the inner enclosed end of chamber 42 and projects axially therefrom. In operation, the bumper stop limits the axial travel of the piston when acted upon by fluid pressures transmitted from the flowline into the chamber 42.

The combination of the pump 2, operating means 7 and 8, and valve means 4 and/or 5 comprises a means which, broadly, senses the presence of a predetermined quantity of entrained gas and impedes the flow in response thereto. When the pump is full of liquid and is operating at its rated pressure for this installation, the shuttle valve is positioned as shown in FIG. 2, whereby chamber 42 above the piston 46 is vented to the suction side of the pump through the restricted side of the flow control valve 8, passage 75, and out passage 74. A differential pressure across the piston 46 moves it axially and opens the butterfly valve device, permitting free metered flow of fluid. When an amount of air enters the pump, its efficiency changes as described above and results in a reduction in flowline pressure. Even a small amount of air will produce a pressure drop of two to four pounds; and, since the shuttle valve 7 is sensitive to small changes in pressure, it responds instantly and occupies the position shown in FIG. 3. The flowline pressure is transmitted from passage 73 to 75, through the free passage portion of flow control valve 8 and into chamber 42. The fluid pressures on either side of piston 46 balance and the spring bias means 50 forces the piston downward, thereby rapidly closing the butterfly valve. This sequence of operations transpires before any air enters the meter.

If the butterfly valve devices were tight seated, thereby preventing any liquid from passing after they were closed, the air which enters the pump upon emptying the supply tank would quite possibly make the pump air bound. In such instances the system would be incapable of ridding itself of entrained air even though fresh supply tanks were opened for the pump to draw upon. Therefore, it is essential that some means be employed to permit entrained air to move through the pump and be evacuated. For this reason the butterfly valves are not tight seated but allow small amounts of liquid to be bled through. The entrained air is trapped in the air eliminator 3 and is exhausted in the conventional manner by a float operated air release valve. An air release valve of sufficient size must be used to lower the pressure in the entire system to a point where all liquid movement in the meter finally stops. The back pressure of the butterfly valves plus the back pressure of the delivery hose and the nozzle all aid in providing enough restriction to cause a final stoppage of the meter even though the pump is delivering great quantities of free air.

When liquid from a newly opened storage compartment now enters the pump, the efficiency of the pump rises and eventually reaches the predetermined operating pressure. The shuttle valve responds thereto and takes the position of FIG. 2, allowing the pressure from chamber 42 to be bled off as previously described. But, since the bleeding of the fluid must pass through the restricted portion of the flow control valve 8, opening of the valve means 4 and 6 is retarded. If the valves were permitted to open the moment the predetermined operating pressure were reached, some entrained gases might by-pass the air eliminator and be metered. Retarding the opening of valves 4 and 6 allows sufficient time for the air eliminator to remove all entrained air.

Having thus described my invention, what I claim and desire to secure by Letters Patent is:

1. A liquid metering system comprising a flowline, a pump connected in said flowline, a liquid meter connected in said flowline downstream of said pump, a shut-off valve connected in said flowline, fluid operated means for actuating said shut-off valve between open and closed positions, conduit means fluidly communicating said fluid operated means to said flowline at a point downstream of said pump, valve means connected in said conduit means for controlling the application of fluid pressure therethrough, means responsive to the pressure in said flowline between said pump and said meter for opening and closing said conduit controlling valve means.

2. The metering system of claim 1 including a gas separator and eliminator connected in said flowline downstream of said pump.

3. The metering system of claim 1 and further including a second conduit means connected to said fluid operated means for relieving the fluid pressure applied thereto to a pressure level less than the discharge pressure of said pump, said second conduit means having a greater fluid flow resistance than said first named conduit means.

4. A liquid metering system comprising a flowline, a pump connected in said flowline, a liquid meter connected in said flowline downstream of said pump, a shut-off valve connected in said flowline downstream of said pump, said valve having a fluid operated means responsive to fluid pressures for opening and closing said valve, a second valve having first, second and third openings and being operative into a position providing fluid communication between said first and second openings and into a second position providing fluid communication between said second and third openings, means fluidly communicating said first opening with said flowline at a point downstream of said pump and upstream of said meter, means fluidly communicating said second opening with said fluid operated means of said shut-off valve, means fluidly communicating said third opening to a pressure source less than the discharge pressure of said pump, and means responsive to a predetermined pressure of fluid in said flowline at a point downstream of said pump and upstream of said meter for operating said second valve into one of said positions.

5. The liquid metering system of claim 4 wherein said means communicating said second opening with said fluid operated means of said shut-off valve comprises a main conduit line having a check valve therein and a bypass line having a restrictive passage, said bypass line having a greater fluid flow resistance than said main conduit line.

6. The liquid metering system of claim 4 including a gas separator and eliminator connected in said flowline downstream of said pump.

7. A liquid metering system comprising a flowline, a pump connected in said flowline, a liquid meter connected in said flowline downstream of said pump, a shut-off valve connected in said flowline downstream of said pump, said valve having a fluid operated means responsive to fluid pressures for opening and closing said valve, said fluid operated means being biased toward a valve closing position by a resilient member and being continuously urged toward a valve opening position by fluid pressure in said flowline downstream of said pump, conduit means fluidly communicating the pressure of said flowline downstream of said pump with said fluid operated means and in aid of said resilient member, valve means connected in said conduit means for controlling the application of fluid pressure therethrough, means responsive to a predetermined pressure in said flowline between said pump and said meter for opening and closing said conduit controlling valve means.

8. The liquid metering system of claim 7 wherein said conduit controlling valve means comprises a valve having first, second and third openings and is operable in a position providing fluid communication between said first and second openings and into a second position providing fluid communication between said second and third openings, said first opening being fluidly connected to said flowline and said second opening being fluidly connected to said fluid operated means; and including means fluidly connecting said third opening to a pressure source less than the discharge pressure of said pump.

9. The liquid metering system of claim 8 wherein said means communicating said second opening with said fluid operated means of said shut-off valve comprises a main conduit line having a check valve therein and a bypass line having a restrictive passage, said bypass line having a greater fluid flow resistance than said main conduit line.

10. The liquid metering system of claim 9 including a gas separator and eliminator connected in said flowline downstream of said pump.

11. A liquid metering system comprising a flowline, a pump connected in said flowline, a liquid meter connected in said flowline downstream of said pump, a gas separator and eliminator connected in said flowline downstream of said pump, a shut-off valve connected in said flowline, a fluid operated means for actuating said shut-off valve between open and closed positions, conduit means fluidly communicating said fluid operated means to said flowline at a point downstream of said pump for transmitting fluid pressures therebetween, valve means connected in said conduit means for controlling the application of fluid pressure from said flowline to said fluid operated means, means for opening said conduit controlling valve in response to the presence of an amount of gas in the flowline between said pump and said meter and for closing said conduit controlling valve in response to a desired decrease in said amount of gas.

12. A system as set forth in claim 11 and further including means connected to said shut-off valve operator for relieving said shut-off valve operator to a pressure less than the discharge pressure of said pump, said means including a conduit having a greater fluid flow resistance than the conduit means connecting said shut-off valve operator to said flowline at the point downstream of said pump and upstream of said meter.

References Cited in the file of this patent

UNITED STATES PATENTS

| | | |
|---|---|---|
| 1,550,445 | Muller | Aug. 18, 1925 |
| 1,726,102 | Forman | Aug. 27, 1929 |
| 1,913,622 | Williams | June 13, 1933 |
| 2,049,239 | Wilcox | July 28, 1936 |
| 2,124,681 | Jauch et al. | July 26, 1938 |
| 2,146,878 | Arbogast | Feb. 14, 1939 |
| 2,237,520 | Brubaker et al. | Apr. 8, 1941 |
| 2,276,838 | Grise | Mar. 17, 1942 |
| 2,300,145 | De Lancey | Oct. 27, 1942 |
| 2,330,703 | Grise | Sept. 28, 1943 |
| 2,693,196 | Hundley | Nov. 2, 1954 |
| 2,694,545 | Steenbergh | Nov. 16, 1954 |
| 2,744,719 | McRae | May 8, 1956 |
| 2,992,757 | Richards | July 18, 1961 |
| 3,021,684 | Berck | Feb. 20, 1962 |